(12) United States Patent
Hagiwara

(10) Patent No.: US 9,810,874 B2
(45) Date of Patent: Nov. 7, 2017

(54) LENS DRIVER

(71) Applicants: Huizhou Dayawan Ever Bright Electronic Industry Co., Ltd, Guangdong (CN); JSS Optical Technology Co., Ltd, Hong Kong (CN); Huizhou Daya Bay Jss Optical Technology Co., Ltd, Guangdong (CN)

(72) Inventor: Kazuyoshi Hagiwara, Kanagawa (JP)

(73) Assignees: HUIZHOU DAYAWAN EVER BRIGHT ELECTRONIC INDUSTRY CO, Huizhou (CN); JSS OPTICAL TECNOLOGY CO., LTD., Hong Kong (CN); HUIZHOU DAYA BAY JSS OPTICAL TECHNOLOGY.CO., LTD., Huizhou (CN)

( * ) Notice: Subject to any disclaimer, the term of this patent is extended or adjusted under 35 U.S.C. 154(b) by 100 days.

(21) Appl. No.: 14/818,884

(22) Filed: Aug. 5, 2015

(65) Prior Publication Data

US 2016/0041363 A1 Feb. 11, 2016

(30) Foreign Application Priority Data

Aug. 8, 2014 (JP) ................................. 2014-162815

(51) Int. Cl.
*G02B 7/02* (2006.01)
*G02B 7/08* (2006.01)

(52) U.S. Cl.
CPC ...................... *G02B 7/08* (2013.01)

(58) Field of Classification Search
CPC . G02B 7/08; G02B 27/64; G02B 7/09; G02B 27/646; G02B 7/102; H04N 5/2253;
(Continued)

(56) References Cited

U.S. PATENT DOCUMENTS 6,631,099 B1 * 10/2003 Kouchiyama ..... G11B 11/10534
369/13.33
2011/0182566 A1 * 7/2011 Watanabe ................ G03B 5/00
396/55

FOREIGN PATENT DOCUMENTS

JP 2011 085666 4/2011
JP 2011085666 A * 4/2011

* cited by examiner

*Primary Examiner* — Ricky Mack
*Assistant Examiner* — Mustak Choudhury
(74) *Attorney, Agent, or Firm* — Hemisphere Law, PLLC

(57) ABSTRACT

A lens driver which has a high driving effectiveness and a compact form, and which does not require a precise assembling and a assembling time. It comprises: a lens holder which holds the lens; a first coil which is arranged on outer circumference of the lens holder so that the lens holder acts towards a direction orthogonal to direction of the optical axis of the lens; a magnet which is arranged on the outer circumference of the first coil and which faces the first coil at a defined distance; a magnet holder which is arranged on the outer circumference of the lens holder to hold the magnet; an upper spring and a lower spring which connect the lens holder and the magnet holder; a second coil which is arranged at a position corresponding to the magnet and spaced from the magnet at a defined distance in the direction of the optical axis, and which makes the lens holder act towards a direction orthogonal to direction of the optical axis of the lens; and a fixation member for fixating the second coil, on the fixation part, holes are opened that can be passed through by the end of the second coil, and the opening size of the hole is greater than the winding size of the second coil, and the end of the second coil passes through the hole and extends from the inner circumference of the second coil towards the outer circumference.

5 Claims, 13 Drawing Sheets

(58) Field of Classification Search
CPC ............ H04N 5/2254; H04N 5/23287; H04N 5/23264; H04N 5/2257; H04N 5/2328; G03B 5/00; G03B 3/10
USPC ....... 359/425, 555–557, 578, 579, 704, 814, 359/822, 826, 827; 348/208.2; 396/55, 396/458
See application file for complete search history.

LENS DRIVER

TECHNICAL FIELD

The present application relates to a lens driver, and in particular, to a lens driver that is used in the cameras of cell phones, tablet PCs and etc.

BACKGROUND

In recent years, cameras mounted in smart phones, tablet PCs and etc. begin to employ high resolution cameras, and mostly have an auto-focusing function. When driving a lens with auto-focusing function, a lens driver is widely employed which has a simple structure and which uses a voice coil motor.

The lens drive using a voice coil motor has a lens holder that keeps the lens in the center, and has on the inner circumference of the lens holder a thread portion that engages with a screw thread portion formed on the lens. By rotation of the lens into a defined focusing position, an adjustment of focused position can be easily performed.

Patent document 1: Japanese patent publication No. JP 2011-85666.

Due to a need for dealing with high resolution of higher than 10 megabytes (MB), the recent cameras, by meas of the lens driver using voice coil motor alone, tend to have the disadvantages of blurred images caused by hand trembling, or shake etc. In order to prevent a blurring, a lens driver is proposed which is equipped with an anti-shake device that can eliminate hand-trembling and external shake.

As a typical anti-shake device, the following devices are known: a device that tilts the optical axis (Z-axis) itself of the lens of the lens driver in a direction that eliminates the dislocation caused by hand-trembling or external shake; a device that swings in the direction of X-axis or Y-axis; and a device that swings the image sensor units laterally, etc.

For example, the lens driver disclosed in patent document 1 uses a hollow coil as a driving coil to swing the optical hand-trembling correction mechanism (Optical Image Stabilizer, "OIS" for short hereafter) in the direction of X-axis and Y-axis, so as to reduce shake. In the following description, the existing lens driving component that merely serves for auto-focusing driving is referred to as AF unit 20, and the anti-shake component is referred to as OIS unit 30.

As shown in FIGS. 1-3, the AF unit 20 has near an lens holder 3 an AF coil 4. Near the AF coil 4, a magnet 6 mounted at a magnet holder 8 faces the AF coil 4 in a defined distance. On the upper side and lower side of the lens holder 3, an upper spring 7 and a lower spring 2 are mounted. An inner ring 7e of the upper spring 7 and an inner ring 2e of the lower spring 2 are fixated at the upper portion and lower portion of the lens holder 3, and a contour portion 7d of the upper spring 7 and an contour portion 2d of the lower spring 2 are fixated at a contour holding portion 8d and an contour holding portion 8e of the lens holder 8.

The inner ring 7e of the upper spring 7 is connected with the contour portion 7d via a driving portion, i.e. an arm 7f, and the inner ring 2e of the lower spring 2 is connected with the contour portion 2d via a driving portion, i.e. an arm 2f. The lens driver 50 is a driving means that utilizes Lorentz force, and it may utilize the intensity of the current through the AF coil 4 to move the lens holder 3 upwards and downwards stably.

The upper ring 7 is made of well-conducting material such as copper alloy. Furthermore, the upper spring 7 is divided into two halves in a rotationally symmetric manner, the inner ring 7e is connected on one side with the winding starting side (end) of AF coil 4, and connected on the other side with the winding ending side (end) of the AF coil 4, therefore, the AF coil 4 can be supplied with electric power (not illustrated). On the lower side of the lower spring 2, a spacer 1 is arranged for stably holding the contour portion 2d of the lower spring 2.

As shown in FIGS. 7-9, in order to move the AF unit 20 in the direction of X-axis and Y-axis, the magnet 6 of the AF unit 20 is extended onto the lower side of the spacer 1 so that a magnetic field is generated on the lower side of the magnet 6. Moreover, in order to utilize this magnetic field, on the fixation part 10 of a printed circuit or a flexible printed circuit (FPC), an OIS coil 11 is such mounted that it faces the lower side 6a. In this case, even if the magnet 6 has the same height as the spacer 1, it is not problematic.

Furthermore, on four corners of the fixation part 10, multiple holes 10h are opened for fixating multiple suspension wires 14. Likewise as the fixation part 10, on four corners of the upper spring 7 of the AF unit 20, holes 7h are opened for being passed through by the suspension wires 14. The suspension wires 14 is fixated via tin solder and adhesive agent, etc., and it is ensured that the upper surface 11c of the OIS coil 11 is spaced from the lower side 6a of the magnet 6 at a defined distance.

On the fixation part 10, a position detecting sensor 13 is respectively arranged on the side of X-axis and Y-axis for detecting the displacement in the direction of X-axis and Y-axis. The OIS coil 11, which is configured in a rotationally symmetric form, is such wired within the fixation part 10 that the coil along the X-axis and the coil along the Y-axis are independent from each and connected in series. Furthermore, the OIS coil 11 is such fixated that the flow direction of current is the same as the orientation of magnet pole of the magnet. Therefore, when the OIS coil 11 that faces the X-axis is electrified, the AF unit 20 applies a reaction force to the magnet 6 in the X-axis direction, and a movement occurs. Likewise for the Y-axis direction as the X-axis, the AF unit 20 is moved in the Y-axis. Moreover, in the case of an opposite direction of current, a movement opposite to the above occurs.

Based on the position detecting sensor 13 (a Hall element is used in the present invention), the displacement in X-axis and Y-axis is determined with respect to the change in position of the magnet 6. Furthermore, the position detecting sensor 13 detects the displacement according to the change in electric potential in X-axis and Y-axis. Moreover, the displacement is proportional to the change in electric potential.

The output of the position detecting sensor 13 is output to the operation circuit provided on the driver IC, etc (not illustrated). The operation circuit enables inflow of current, so as to act in a manner that eliminates the shake; the current is a current that is require in order to move in a direction opposite to the shake direction obtained from external gyroscope sensor, etc. (not illustrated).

The divided upper spring 7 is connected with the winding starting side and winding ending side (end) of the AF coil 4, and electric power is supplied to the AF unit 20 via the suspension wire 14 on four corners.

On the lower side of the OIS power supply 30, a base 40 is arranged. near the base 40, a cover 41 is mounted for covering the AF unit 20 and the OIS unit 30. The fixation part 10 itself is composed of printed circuit, and a power supply to the AF unit 20 and OIS unit 30, and an output from the position detecting sensor 13 are performed with the printed circuit on the fixation part 10.

From the perspective of deployment of components, the OIS coil 11 employs a conventional hollow coil with a stacked structure. However, in the case that a conventional hollow coil is used to form the structure shown in the patent document 1, the problems exist.

A conventional hollow coil with a stacked structure is winded from inside to outside. Therefore, when the led-out portion of the winding starting terminal (end) is arranged towards the outer side of the stacked portion, the led-out portion will bypass the adjacent hollow coil (the stacked portion), so that a state forms in which the bypassed portion protrudes upwards or downwards.

As shown in FIG. 10. the led-out portion of the winding starting terminal can also be arranged within the winding inner diameter d2 of the OIS coil 11. However, from the perspective of compactness, the thickness of the magnet 6 of the OIS unit 30 should be reduced as much as possible relative to the lens diameter. On the other hand, if the thickness of the magnet 6 is reduced, then the flux density will be reduced, so that the actuating force will drop, which leads to a problem how the magnetic loop can be effectively formed.

As shown in FIG. 11, if the winding inner diameter d1 of the OIS coil 11 reduces the thickness of the magnet 6 by a constant amount (d1<d2), then it can be used in a state in which the flux density of the magnet 6 is relatively high, and the actuating force will not drop. However, when the winding starting terminal and the winding ending terminal (end)) of the OIS coil are arranged within the winding inner diameter, a connecting portion 10b will become too small, and thus it is difficult in the practice. This is because due to a too small distance between adjacent coils, an isolation cover film will melt, even if a laser device is used for soldering or welding. Therefore, it is required to lead the let-out portion 11a of the winding starting terminal of the OIS coil outside the OIS coil 11. Although by doing this, the let-out portion 11a of the winding starting terminal of the OIS coil 11 may be fixated at the fixation part 10, it may lead to an unstable action of the OIS coil 11 because the protrusion will cause a mounting in a tilted state.

Furthermore, as shown in FIG. 12, when the let-out portion 11a of the winding starting terminal of the OIS coil 11 is mounted on top of the fixation part 10, in spite of a stable mounting on the fixation member 10, the let-out portion 11a of the winding starting terminal will protrude from the upper surface of the OIS coil 11 and traverses the OIS coil 11. At this point, it is at least required that the distance between the lower side 6a of the magnet 6 and the upper surface 11c of the OIS coil 11 should reach the value of the thickness of the led-out portion 11a of the winding starting terminal (the distance between the lower side 6a and the OIS coil 11, the lower side 6a of the magnet 6 and the OIS coil 11), and the actuating force drops as the distance increases.

In order to avoid the above poor case shown in FIG. 11, the led-out portion 11a of the winding starting terminal of the OIS coil 11 passes through the gap between it and the fixation part 10. In particular, more than on lap (wire diameter) is fastened temporarily to a not illustrated assembling clamp, and the positions in the direction of X-axis, the direction of Y-axis and the direction of Z-axis are adjusted so that the upper surface 11c of the OIS coil 11 that faces lower side 6a of the magnet 6 is parallel to the fixation part 10.

However, after the upper surface 11c of the OIS coil sticks by air, Z-axis is temporarily fixated using the not illustrated assembling clamp and the position is adjusted to a position of a height determined relative to the fixation part 10, then the gap portion is fixated via adhesive agent. Nevertheless, due to a small width of the OIS coil 11, it is unstable and tends to tilt or deviate from the central position, which leads to a worse action characteristics. In order to counteract the worse characteristics, it is required to perform a precise adjustment using a clamp that is mounted in a high precision, and thus the operating time required for the adjustment increases, which leads to higher costs.

As shown in FIG. 13, on the fixation part 10, a via-hole 10k is opened which passes through the fixation part 10 in a direction along the optical axis. The winding starting side (end) of the OIS coil 11 may be connected to the lower surface of the fixation part 10 through the via-hole 10k. However, it is not easy to pass the winding starting side (end) through the via-hole 10k, and it is required that, after the OIS coil 11 is completely fixated on the fixation part 10, it should be turned over to be electrically connected, which is complicated process.

SUMMARY OF THE INVENTION

To solve the above technical problems, the object of the present invention lies in providing a lens driver which has a high driving effectiveness and a compact form, and which does not require a precise assembling and a assembling time.

The lens driver of the invention comprises: a lens holder which holds the lens; a first coil which is arranged on outer circumference of the lens holder so that the lens holder acts towards a direction orthogonal to direction of the optical axis of the lens; a magnet which is arranged on the outer circumference of the first coil and which faces the first coil at a defined distance; a magnet holder which is arranged on the outer circumference of the lens holder to hold the magnet; an upper spring and a lower spring which connect the lens holder and the magnet holder; a second coil which is arranged at a position corresponding to the magnet and spaced from the magnet at a defined distance in the direction of the optical axis, and which makes the lens holder act towards a direction orthogonal to direction of the optical axis of the lens; and a fixation part for fixating the second coil, on the fixation part, holes are opened that can be passed through by the end of the second coil, and the opening size of the hole is greater than the winding size of the second coil, and the end of the second coil passes through the hole and extends from the inner circumference of the second coil towards the outer circumference.

The hole of another lens driver is circular or polygonal.

The hole of another lens driver passes through along the direction of the optical axis.

The fixation part of another lens driver is formed by printed circuit or flexible printed circuit.

Another lens driver is has a structure in which a plurality of second coils are connected.

The inner diameter of the second coil of another lens driver is set below 0.6 mm.

Furthermore, the above summary of the invention does not exhaustively enumerate all features required by the invention, and a combination of the above features also falls within the invention.

Because the second coil is winded along an edge of the winding clamp with which the winding is performed, its end will not interfere with the second coil and can be stably arranged in the direction of the optical axis.

Furthermore, because the second coil is winded from inside to outside at the winding clamp which determines the width of the inner side, the lateral side of the inner side is perpendicular to the upper and lower end face. The fixation part has a hole which is deeper than the wire diameter of the second coil and which is larger than the winding width of the second coil. The hole is opened at the position of the end of the second coil, and the lower surface of the winding starting side is directly mounted at the fixation part. As such, the end of the second coil may enter into the hole of the fixation part, and protrudes into the outside of the second coil without interference with the lower surface of the second coil, therefore, the fixation part and the second coil may be stably mounted in the direction of the optical axis.

Furthermore, the end of the second coil is in a state in which it can be guided back via the hole and can be easily arranged on the outer circumference of the second coil and can be easily arranged on the upper surface of the fixation part.

Moreover, the end of the second coil, even if it protrudes onto the outside of the second coil, may be connected with the fixation part; therefore, the winding inner diameter of the second coil may be reduced in coordination with the decrease of the width of the magnet, and the driving efficiency may be optimized.

As described above, in the invention, the second coil and the fixation part may be steadily mounted without the need for a special clamp. Hence, a lens driver may be provided which, in spite of a simple structure that is same in the X-axis and Y-axis, has a compact structure and high driving efficiency.

Figure 1:
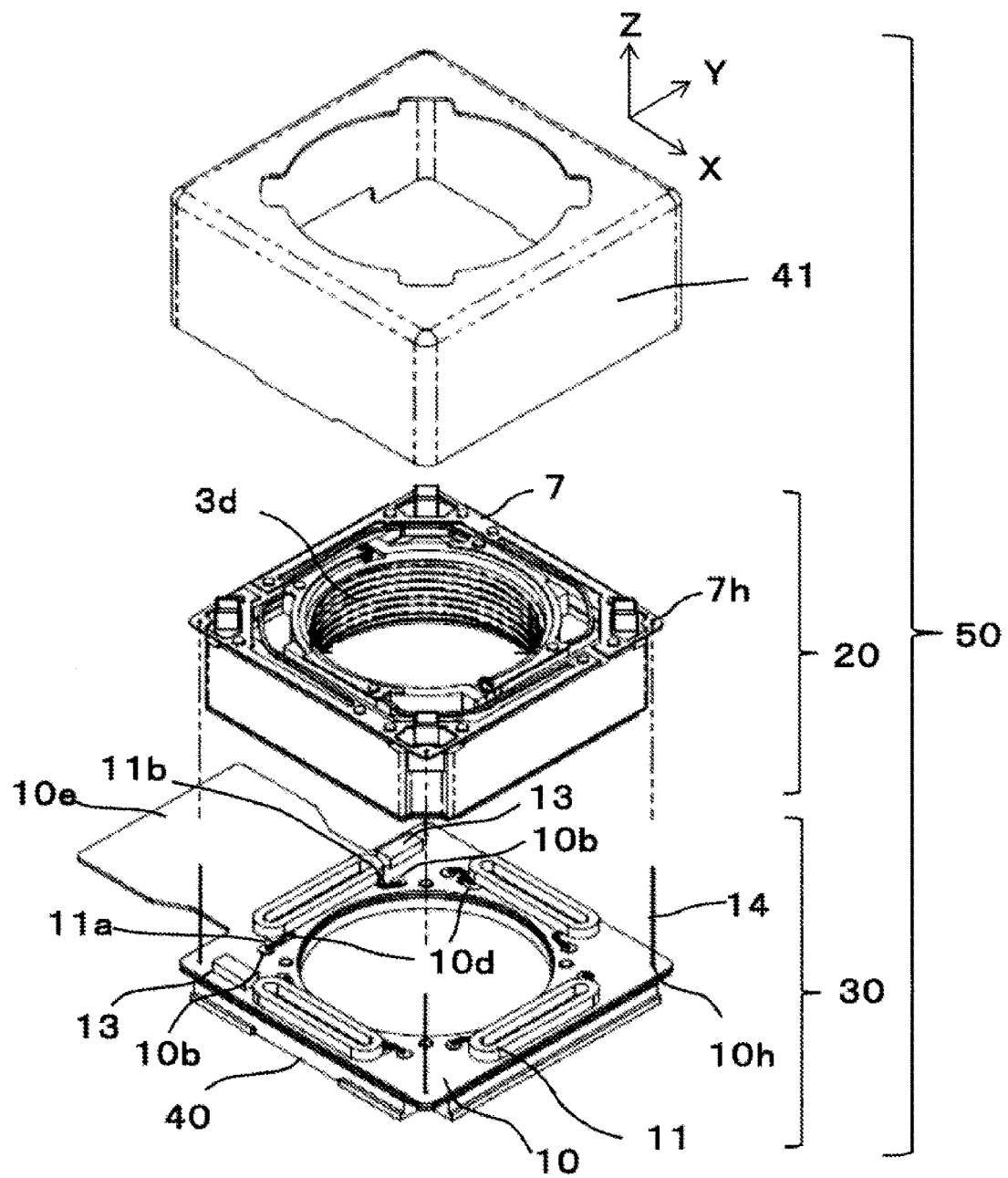
FIG. 1 is an exploded view of the lens driver of the first embodiment of the invention.

A DESCRIPTION OF REFERENCE NUMERALS 1 spacer
2 lower spring
3d contour portion
2e inner ring
2f arm 3 lens holder
3a front engaging portion
3d thread portion
4 AF coil
6 magnet
6a lower side
7 upper spring
7a leading portion
7d contour portion
7e inner ring
7f arm
7h hole
8 magnet holder
8d contour portion
8e contour holding portion
10 fixation part (or base)
10b connecting portion
10d hole
10e input/output portion
10h hole
10k via-hole
11 OIS coil (air core coil shape)
11a led-out portion
11b led-out portion
11c upper surface
11d connecting portion
13 position detecting sensor
14 suspension wire
20 AF unit
30 OIS unit
40 base
41 cover
50 Lens Driver

DETAILED DESCRIPTION OF THE INVENTION

The invention is described below in conjunction with embodiments, and the following embodiments constitute in no way a limit on the invention involved in the claims; furthermore, a combination of all features described in the embodiments is not essential for the problem-solving technical means of the invention.

Figure 2:
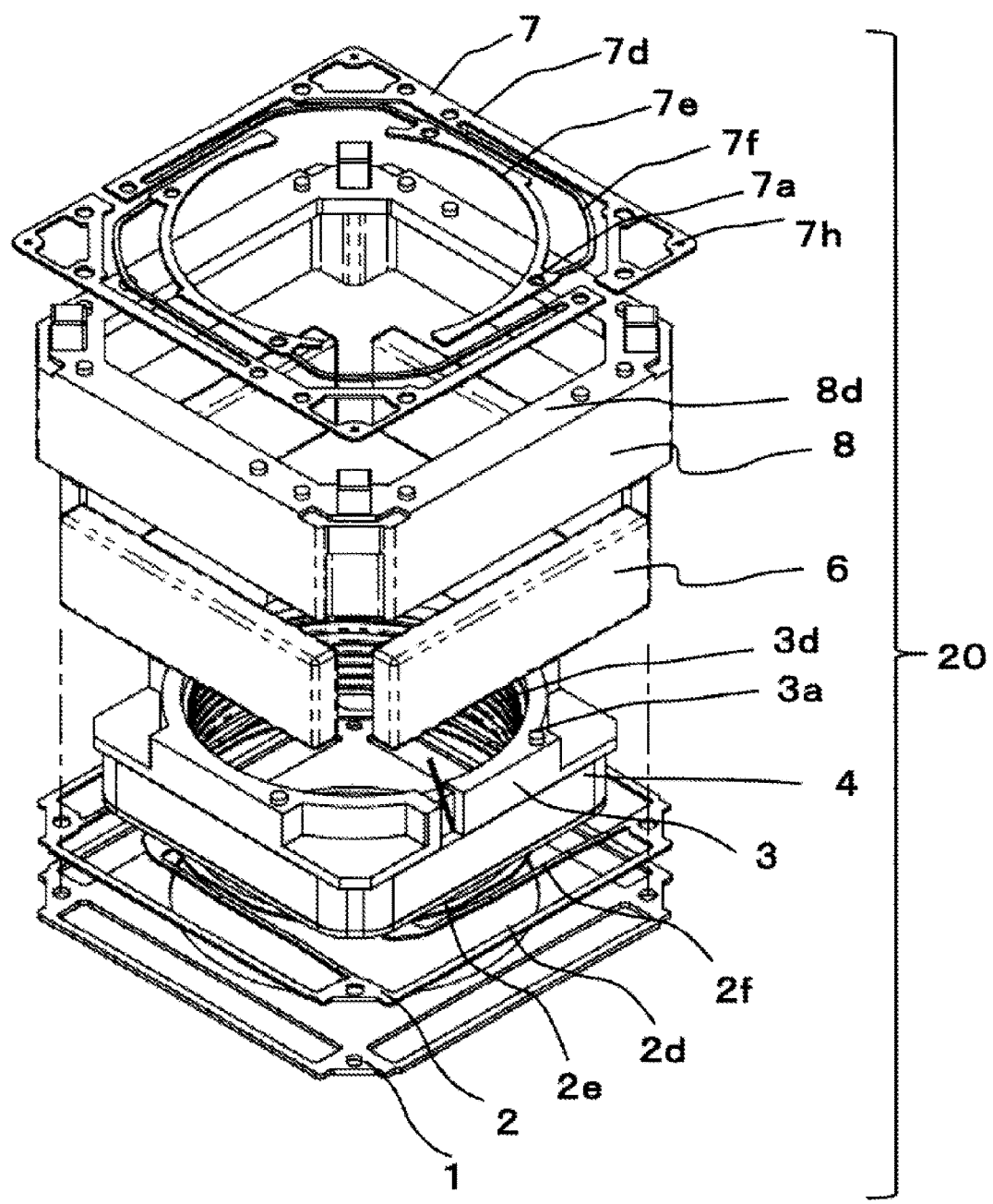
FIG. 2 is an exploded view of the AF unit of the first embodiment of the invention.

FIG. 1 is a perspective view in which the lens driver 50 of the invention is illustrated in a unit-by-unit exploded manner. FIG. 2 is a perspective view in which the AF unit 20 of the lens driver 50 of the invention is illustrated in an exploded manner.

As shown in the figure, the lens driver 50 of this embodiment comprises: a lens holder 3 which has on its inner circumference a thread portion 3d that holds the not illustrated lens; an AF coil 4 (a first coil) which is arranged on outer circumference of the lens holder 3 and which is mounted at the lens holder 3 so that the lens holder 3 acts towards a direction orthogonal to direction of the optical axis of the lens; a plurality of magnets 6, the shape of inner circumference of which is formed as the shape of an outer circumference along the AF coil 4 and which are arranged on the outer circumference of the AF coil 4 and face the AF coil 4 at a defined distance in the direction orthogonal to the optical axis; a magnet holder 8 which is arranged on the outer circumference of the lens holder 3 to hold the magnets 6; an upper spring 7 which is arranged on the side of photographed object of the lens (opening side), i.e. on the +Z side of Z-direction (upper side) and which connects the lens holder 3 and the magnet holder 8; a lower spring 2 which is arranged on a side opposite to the photographed object side of the lens (opening side), i.e. on the −Z side of Z-direction (lower side) and which connects the lens holder 3 and the magnet holder 8; and a spacer 1 which is arranged on the −Z side of the lower spring 2 (lower side) to hold the lower spring. The individual magnets 6 are configured such that the outer circumference is N pole and the inner circumference is S pole.

Figure 3:
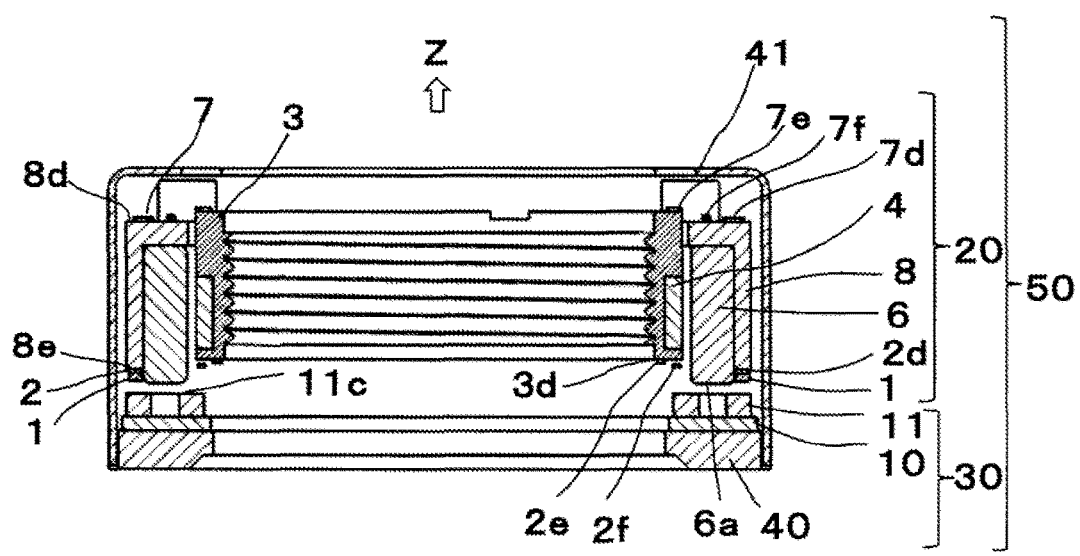
FIG. 3 is an sectional view of the lens driver in Y-axis direction of the first embodiment of the invention.
Figure 4:
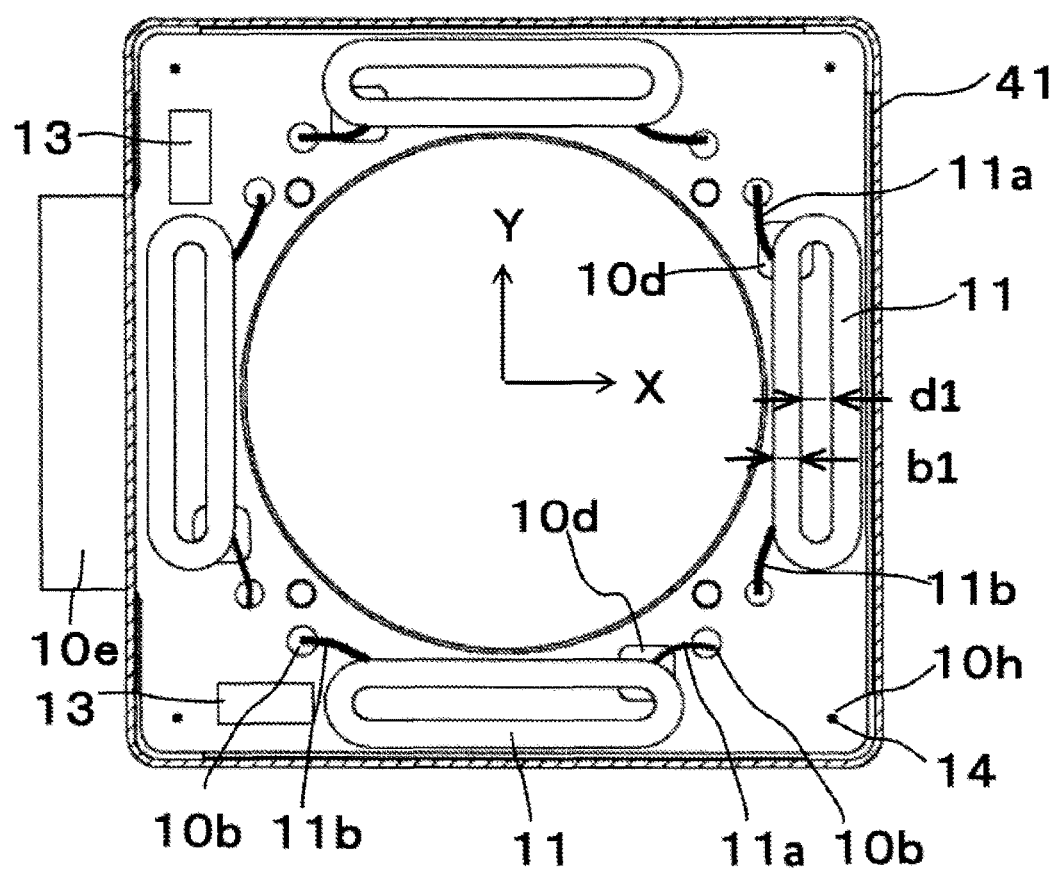
FIG. 4 is an sectional view of the lens driver in a direction perpendicular to X-Y plane of the first embodiment of the invention.
Figure 5:
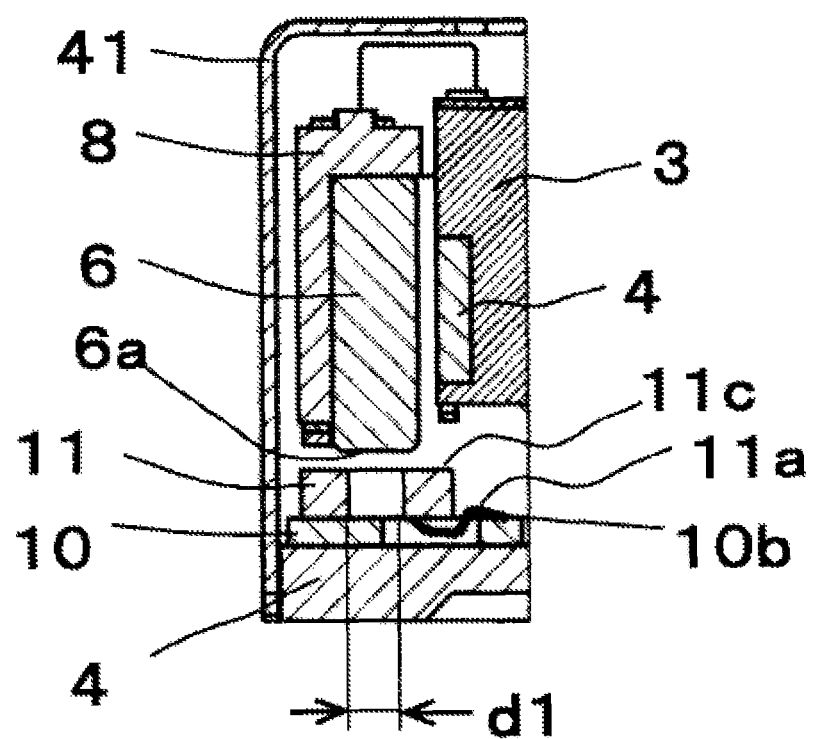
FIG. 5 is a partial sectional view of the lens driver of the first embodiment of the invention.

As shown in FIGS. 1-3, the contour portion 2$d$ of the lower spring 2 is mounted at the magnet holder 8 in a manner that the contour portion 2$d$ form-fits with the contour holding portion 8$e$ located on the lower side o the magnet holder 8. The contour portion 7$d$ of the upper spring 2 is mounted at the magnet holder 8 in a manner that the contour portion 7$d$ form-fits with the contour holding portion 8$d$ located on the upper side of the magnet holder 8. The leading portion 7$a$ of the upper spring 7 engages with the front engaging portion 3$a$ of the lens holder 3 so as to determine the mounting position relative to the lens holder 3.

The AF coil 4 is triangle, and faces the magnet 6 which held at the magnet holder 8.

The upper ring 7 is made of well-conducting material such as copper alloy, and divided into two parts in a shape that forms rotational symmetry. The winding starting terminal (end) and winding ending terminal (end) of the AF coil 4 are electrically connected with the divided inner circumference portion. Furthermore, on four corners of the upper spring 7, holes 7$h$ are opened for fixating suspension wires 14. As such, when the AF coil 4 is energized, the AF coil 4 will generate a Lorentz force towards the photographed object, i.e. the direction of the optical axis (Z-axis direction (the up-down direction)), so that the above lens holder 3 is moved a defined position that can be balanced with the restoring force of the upper spring 7 and the lower spring 2.

As shown in FIGS. 1-3, on the fixation part 10, a second coil, i.e. the OIS coil 11 is fixated at a position that corresponds to the lower side 6$a$ of the magnet 6 of the AF unit 20. The OIS coil 11 is an air core coil. Furthermore, in order to detect the direction of X-axis and Y-axis, one position detecting sensor 13 is respectively mounted on each of X side and Y side. The fixation member 10 is, for example, composed of printed circuit or flexible printed circuit (PFC), and the fixation part 10 of the invention is FPC. That is, the fixation part 10 constitutes a circuit (not illustrated) by means of the connecting portion 10$b$ of the led-out portion 11$a$ and the connecting portion 10$b$ of the led-out portion 11$b$ of the winding ending terminal (end), the position detecting sensor Moreover, the holes 10$h$ opened on four corners of the fixation part 10 constitutes not only the mounting position for the suspension wire 14, but also it serves as a electrical connecting portion for connecting with the above circuit. At the end of the fixation part 10, a input/output portion is arranged for the OIS coil 11 and the AF coil 4.

As shown in FIG. 1, the AF unit 20 and the OIS unit 30 are arranged such that the suspension wire 14 passes through the hole 10$h$ and reaches a defined height. As described above, the upper spring 7 is divided into two parts, and the AF coil 4 is electrically connected so that an AF-action may be performed.

Moreover, for the suspension wire 14 that made of well-conducting copper alloy is used.

As shown in FIGS. 1-5, in the case of the structure in which the width of the magnet 6 is reduced and the outline is compact, it is preferred that the hole 10$d$ is greater than the opening size of the led-out portion 11$a$ of the winding starting terminal (end) of the OIS coil 11 plus the winding size b1 of the OIS coil 11 and the wire diameter, and deeper than the wire diameter. Specifically, when it is preformed such that the led-out portion 11$a$ of the winding starting terminal (end) is led to the outside of the OIS coil 11, the led-out portion 11$a$ of the winding starting terminal can be led towards outside. Next, the OIS coil 11 is fixated at the fixation part 10, and the led-out portion 11$a$ of the winding starting terminal (end) is led back via the via-hole 10$d$. By this, it is not necessary to use precise clamp for spatial adjustment, but only by means of an adjustment in X-axis and Y-axis is performed, the OIS coil 11 can be easily placed at a determined position on the fixation part 10, and the OIS coil 11 may operate stably.

Furthermore, because the led-out portion 11$a$ of the winding starting terminal (end) is connected to the outside of the OIS coil 11, the winding inner diameter d1 of the OIS coil 11 may be reduced to its limit, and even if the thickness of the magnet 6 is low, the flux density can also be increased and the actuating efficiency can be enhanced.

Moreover, in the case of the lens driver 50 of the first embodiment, the hole 10$h$ of the fixation part 10 is formed as rectangle, but it is not limited thereto; and it is self-evident that, even if it is formed as circle (including ellipse), polygon, the same technical effect can also be achieved.

Figure 6:
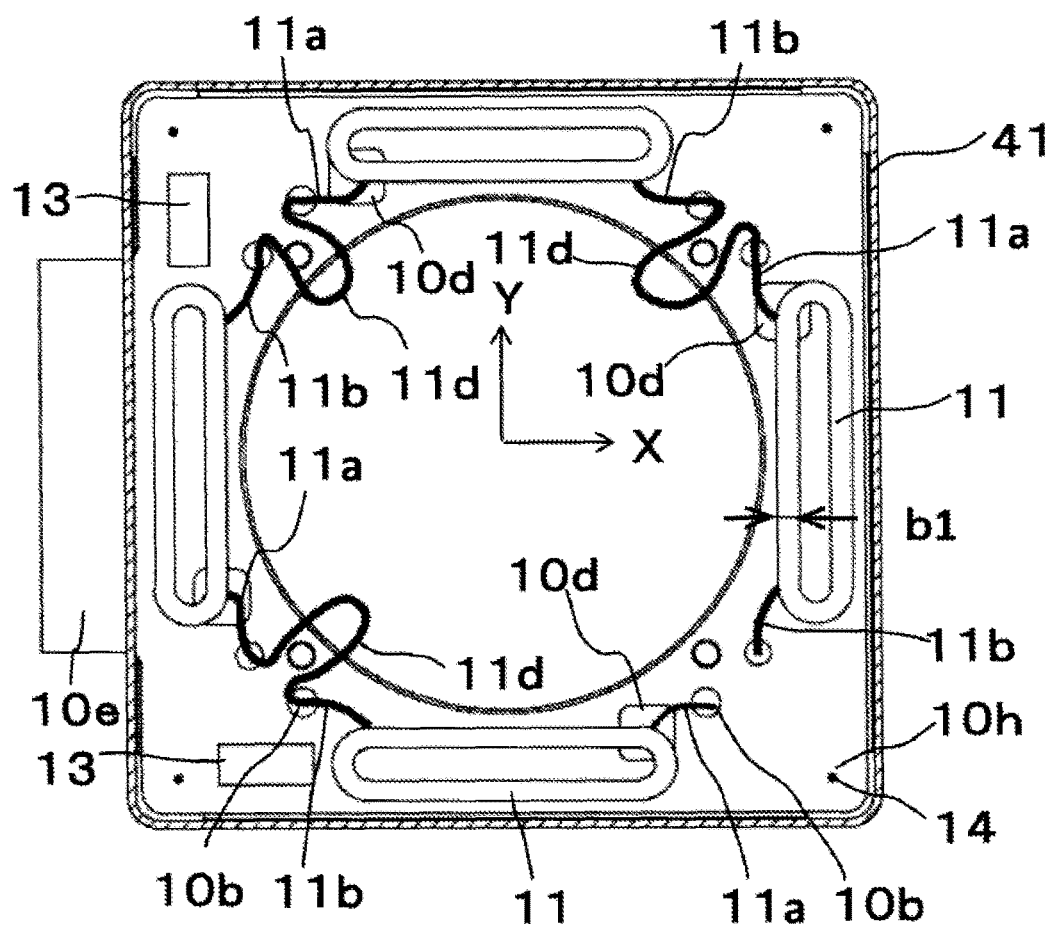
FIG. 6 is an sectional view of the lens driver in a direction perpendicular to X-Y plane of the second embodiment of the invention.
Figure 7:
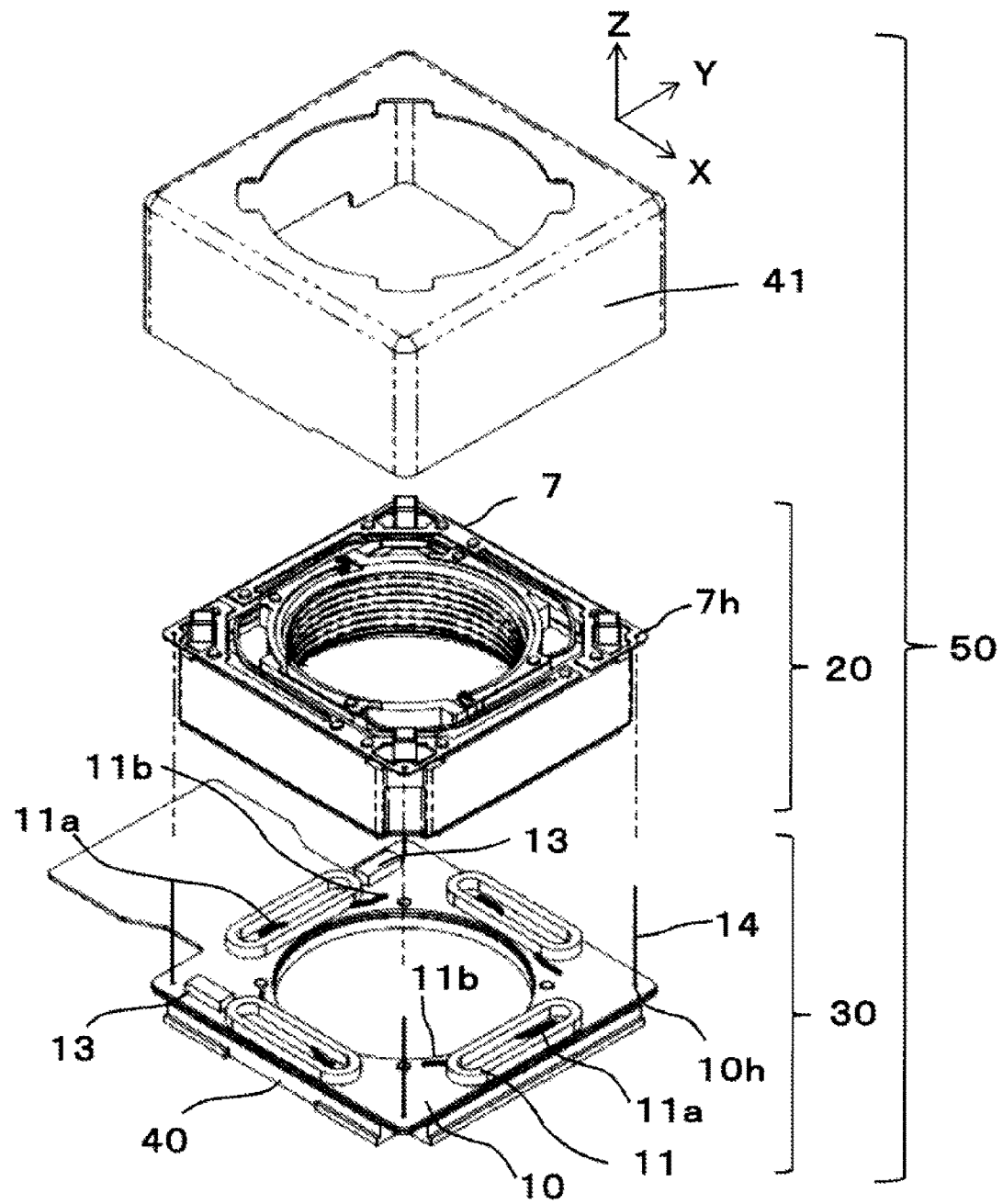
FIG. 7 is an exploded view of a lens driver from the prior art.
Figure 8:
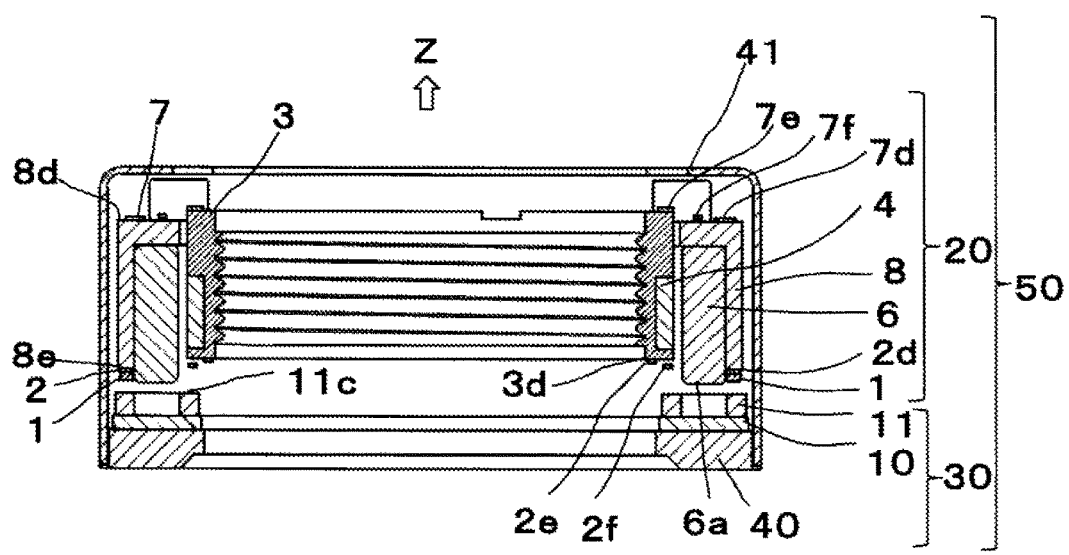
FIG. 8 is an exploded view of the lens driver from the prior art in Y-direction.
Figure 9:
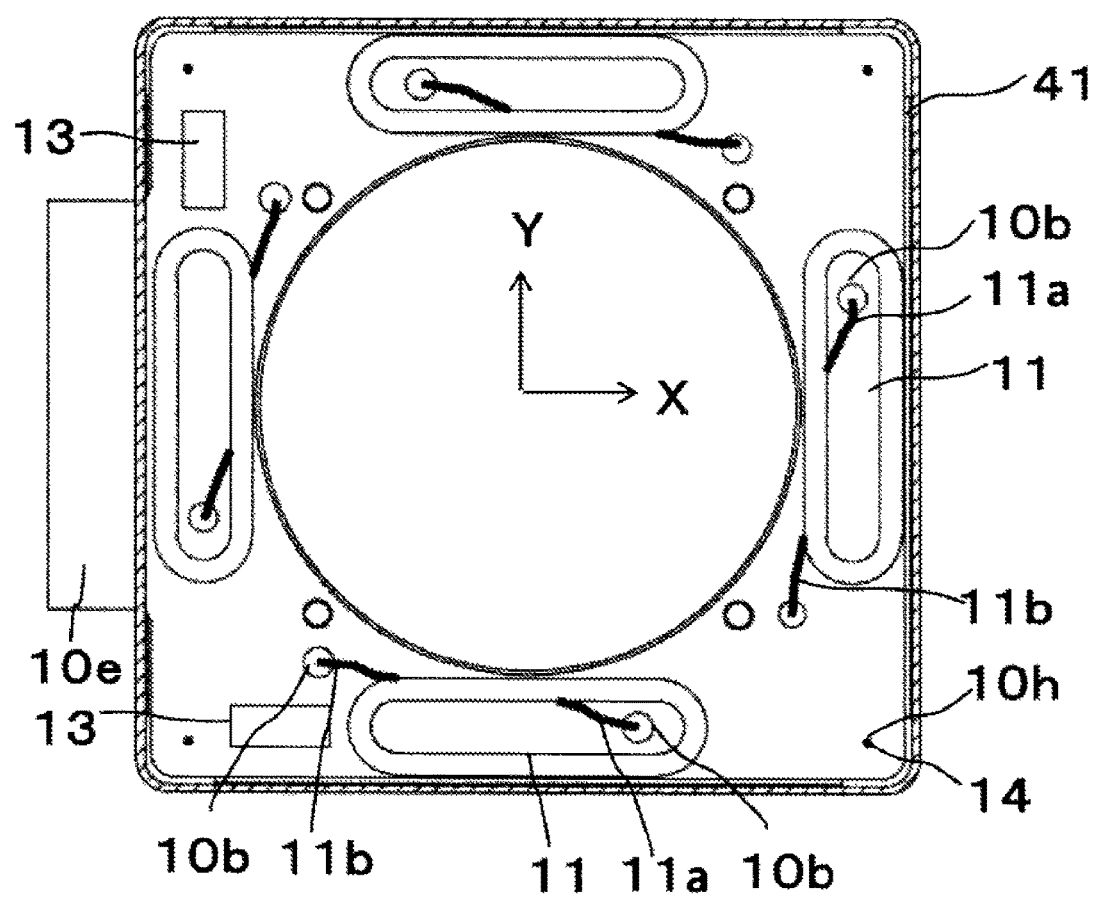
FIG. 9 is an exploded view of the lens driver from the prior art in a direction perpendicular to X-Y plane.
Figure 10:
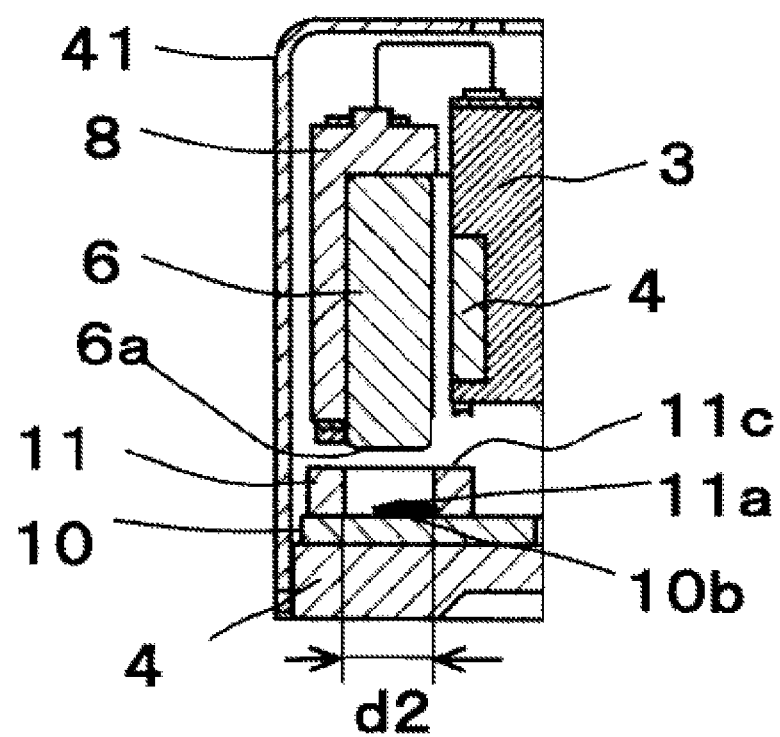
FIG. 10 is a partial sectional view of an OIS unit from the prior art.
Figure 11:
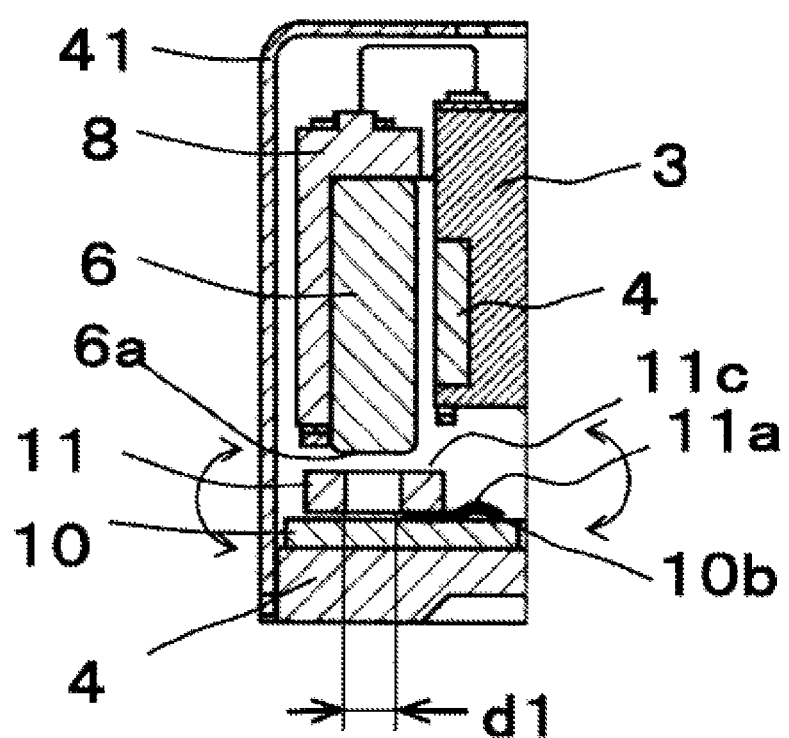
FIG. 11 is a partial sectional view of an OIS unit from the prior art that is different from that in FIG. 10.
Figure 12:
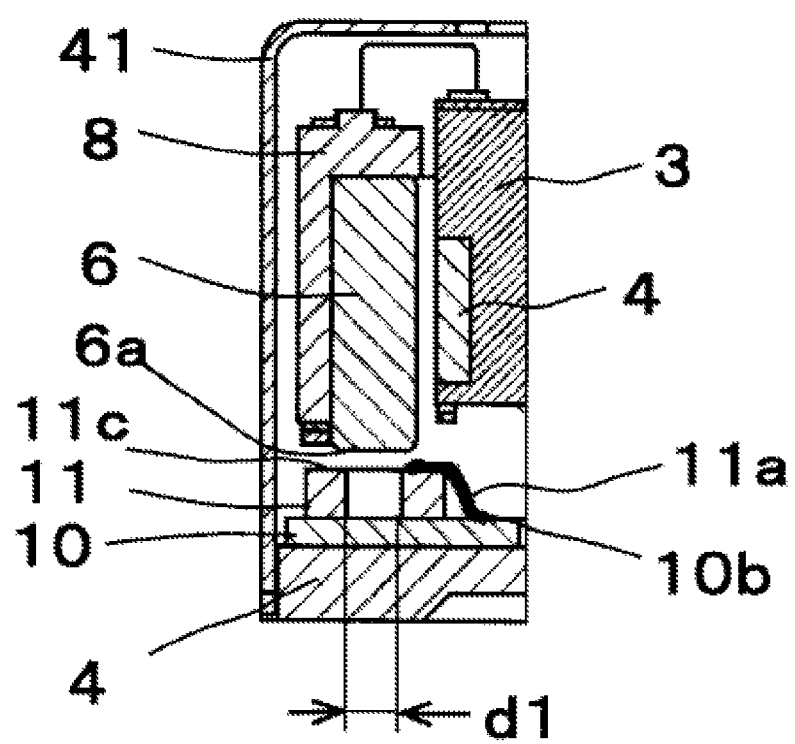
FIG. 12 is a partial sectional view of an OIS unit from the prior art that is different from that in FIGS. 10 and 11.
Figure 13:
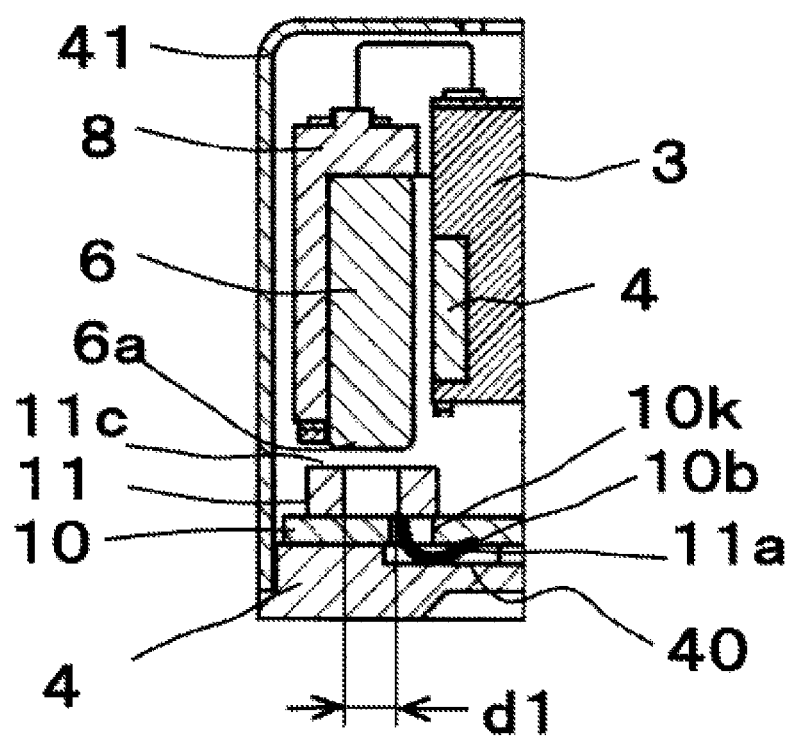
FIG. 13 is a partial sectional view of an OIS unit from the prior art that is different from that in FIGS. 10, 11 and 12.

Moreover, as shown in FIG. 6, as a second embodiment, a structure is formed in which multiple OIS coils 11 are connected, however, this structure can also be formed by connecting from upper side of the fixation member as described in the first embodiment. It is only required to fixate the OIS coil 11 at the fixation part 10, and to cut off the connecting portion 11$d$ which is connected after the led-out portion 11$a$ of the winding starting terminal (end) is connected with the led-out portion 11$b$ of the winding ending terminal (end). By this, it can be prevented that the led-out portion 11$a$ of the winding starting terminal and the led-out portion 11$b$ of the winding ending terminal are mounted at the clamp in a wrong direction, and it is able to shorten and simplify the mounting operation.

Furthermore, in consideration of the actual actuating force and demagnetization, the limit of thickness of the magnet 6 is about 0.6 mm. Hence, in order to obtain a maximal actuating force, it is preferred that the winding inner diameter d1 of the OIS coil 11 is also set below 0.6 mm.

The invention is described above in conjunction with embodiments, but the scope of the invention is not limited to the scope recited in the above embodiments. Those skilled in the art may alter or improve the above embodiments. It is appreciated based on the claims that, these altered or improved embodiments also fall within the scope of the invention.

What is claimed:

1. A lens driver, characterized in that, comprising:
   a lens holder configured for holding a lens;
   a first coil which is arranged on an outer circumference of the lens holder so that the lens holder acts towards a direction parallel to a direction of an optical axis of the lens;
   a plurality of magnets which are arranged on the outer circumference of the first coil and face the first coil at a defined distance;
   a magnet holder which is located on the outer circumference of the lens holder and which holds the plurality of magnets;
   an upper spring and a lower spring which connect the lens holder and the magnet holder;
   a plurality of second coils which are arranged at positions corresponding to the plurality of magnets and spaced from the plurality of magnets at a defined distance in the direction of the optical axis, and which make the lens holder act towards a direction orthogonal to the direction of the optical axis of the lens; and a fixation part for fixating the plurality of second coils from a side of the second coils opposite to the plurality of magnets, on which holes are opened at positions corresponding to winding starting terminals of the plurality of second coils;

an opening size of each hole is greater than a winding size of a corresponding one of the plurality of second coils, and the winding starting terminal of the second coil passes through the hole and extends from an inner circumference of the second coil to an outer circumference of the second coil without increasing a height of the fixation part plus the second coil.

2. The lens driver of claim 1, characterized in that, each hole is circular or polygonal.

3. The lens driver of claim 1, characterized in that, each hole passes through the fixation part along the direction of the optical axis, and is deeper than a wire diameter of the winding starting terminal of the second coil.

4. The lens driver of claim 3, characterized in that, the fixation part is formed by a printed circuit or a flexible printed circuit.

5. The lens driver of claim 4, characterized in that, an winding inner diameter of each second coil is set below 0.6 mm.

* * * * *